UNITED STATES PATENT OFFICE.

ROBERT SEAVER EDWARDS, OF SAN FRANCISCO, CALIFORNIA.

PROCESS OF EXTRACTING COPPER FROM ORE.

1,319,858.

Specification of Letters Patent. Patented Oct. 28, 1919.

No Drawing. Application filed December 10, 1917. Serial No. 206,504.

*To all whom it may concern:*

Be it known that I, ROBERT S. EDWARDS, a citizen of the United States, and resident of San Francisco, California, 2241 Glen avenue, Berkeley, California, have invented certain new and useful Improvements in Processes of Extracting Copper from Ore, of which the following is a specification.

My present invention relates to an improved process of extracting copper from its ores, and aims to provide a simple and economical process capable of being profitably used in connection with low grade ore and tailings.

The invention includes the novel process hereinafter described and defined by the appended claims.

In proceeding according to my invention the ore or material to be treated, if not already in comminuted condition is finely ground and mixed with a hydrated base, preferably hydrate of lime, and a suitable sodium salt of a mineral acid, preferably sodium chlorid or common salt. While a variety of such salts may theoretically be used, sodium chlorid is apparently the only one practically available for commercial process on account of its low first cost and recoverability. This mixture is then furnaced in a rotary kiln and cuprous chlorid is formed at a low temperature, to wit, approximately 500° F., as the salt is melted, the volatilization of the copper in this form being assisted by the steam generated by the action of the heat on the water of combination in the hydrated base. Upon the raising of this temperature to 1000° or above the cuprous chlorid distils without change and is condensed by water spray or Cottrell dust treaters, and the copper is separated out or recovered from the solution by ordinary electrolysis, or by other known methods of recovery. The residue passes through the kiln and drops while red hot into water contained in iron pans which immediately collect by deposition any copper that may not have been volatilized.

I have found that the copper exists in its mineral formations or compounds in strong equilibrium, that is in intimate and strongly bound association, and that it is necessary to absolutely break down this existing equilibrium and destroy the bond. In order to accomplish this I use a much larger percentage than necessary to make the complete reaction, or in other words an amount of salt in excess of that required to furnish the exact molecular equivalent. Sodium chlorid or common salt is selected on account of its cheapness, and furthermore, as the excess can be recovered and reused there is no waste.

What I claim is:

1. The process of extracting copper from copper bearing minerals which comprises heating a mixture of finely divided mineral, an excess of salt and a hydrated base which, when heated, gives off its water of combination as steam.

2. The process of extracting copper from copper bearing minerals which consists in heating to not less than 1000° F. a mixture of the finely divided mineral, a hydrated base, and an excess of salt, to evolve cuprous chlorid absorbing and collecting the cuprous chlorid by a water spray, and recovering the copper by electrolysis.

3. The process of extracting copper from copper bearing minerals which consists in heating to the volatilization point of the salt, (sodium chlorid) a mixture of the finely divided mineral, an excess of salt and a finely divided carbonate of lime to form and evolve cuprous chlorid and then absorbing and collecting the cuprous chlorid by condensing apparatus.

4. The process of extracting copper from copper bearing minerals which consists in heating to the volatilization point of the salt, (sodium chlorid) a mixture of the finely divided mineral, an excess of salt and a finely divided carbonate of lime in the presence of steam, to form and evolve cuprous chlorid and then absorbing and collecting the cuprous chlorid by condensing apparatus.

5. The process of extracting copper from copper bearing minerals which consists in heating to not less than 1000° F. a mixture of the finely divided mineral, a hydrated base and an excess of salt, to convert the copper to cuprous chlorid, quenching the mixture after heating, in water contained in iron pans and so depositing the copper, which has not been volatilized, and recovering the same.

In testimony whereof, I affix my signature.

ROBERT SEAVER EDWARDS.